(12) United States Patent
Lai et al.

(10) Patent No.: US 11,579,643 B2
(45) Date of Patent: Feb. 14, 2023

(54) ADAPTIVE VOLTAGE SCALING SCANNING METHOD AND ASSOCIATED ELECTRONIC DEVICE

(71) Applicant: Realtek Semiconductor Corp., HsinChu (TW)

(72) Inventors: Chao-Min Lai, HsinChu (TW); Hung-Wei Wang, HsinChu (TW); Tang-Hung Chang, HsinChu (TW); Han-Chieh Hsieh, HsinChu (TW); Chun-Yi Kuo, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 224 days.

(21) Appl. No.: 17/088,560

(22) Filed: Nov. 3, 2020

(65) Prior Publication Data

US 2021/0141407 A1 May 13, 2021

Related U.S. Application Data

(60) Provisional application No. 62/933,514, filed on Nov. 10, 2019.

(30) Foreign Application Priority Data

Apr. 1, 2020 (TW) .................................. 109111279

(51) Int. Cl.
*G05F 1/46* (2006.01)
*G06F 1/3296* (2019.01)
*H02M 3/156* (2006.01)

(52) U.S. Cl.
CPC ............ *G05F 1/465* (2013.01); *G06F 1/3296* (2013.01); *H02M 3/156* (2013.01)

(58) Field of Classification Search
CPC ...... G05F 1/465; G06F 1/3296; G06F 9/4401; G06F 1/324; H02M 3/156; Y02D 10/00
See application file for complete search history.

(56) References Cited

U.S. PATENT DOCUMENTS

| | | | |
|---|---|---|---|
| 2008/0162770 A1* | 7/2008 | Titiano | G06F 1/3203 710/309 |
| 2008/0307240 A1 | 12/2008 | Dahan | |
| 2009/0204831 A1 | 8/2009 | Cousson | |
| 2011/0080202 A1* | 4/2011 | Moore | H03K 3/012 327/261 |
| 2011/0181337 A1 | 7/2011 | Otsuga | |
| 2013/0311799 A1* | 11/2013 | Fitzpatrick | G06F 1/3203 702/186 |

* cited by examiner

*Primary Examiner* — John W Poos
*Assistant Examiner* — Tyler J Pereny
(74) *Attorney, Agent, or Firm* — Winston Hsu

(57) ABSTRACT

The present invention discloses an AVS scanning method, wherein the AVS scanning method includes the steps of: mounting a system on chip (SoC) on a printed circuit board (PCB), and connecting the SoC to a storage unit; enabling the SoC to read a boot code from the storage unit, and executing the boot code to perform an AVS scanning operation on the SoC to determine a plurality of target supply voltages respectively corresponding to a plurality of operating frequencies of the SoC to establish an AVS look-up table; and storing the AVS look-up table into the SoC or the storage unit.

18 Claims, 4 Drawing Sheets

ADAPTIVE VOLTAGE SCALING SCANNING METHOD AND ASSOCIATED ELECTRONIC DEVICE

CROSS REFERENCE TO RELATED APPLICATIONS

This application claims the benefit of U.S. provisional application No. 62/933,514, which was filed on Nov. 10, 2019, and is included herein by reference.

BACKGROUND OF THE INVENTION

1. Field of the Invention

The present invention is related to an adaptive voltage scaling (AVS) scanning method.

2. Description of the Prior Art

In general consumer electronics, a central processing unit (CPU) and a graphic processing unit (GPU) within a system on chip (SoC) are important indicators for performance, where the higher the maximum operating frequency of the CPU and the GPU, the better the performance. A high operating frequency needs a high supply voltage, however, which causes large power consumption and impacts the lifetime of an electronic product. Furthermore, due to the problem of process distribution of a chip, when speed of the chip is high, a low supply voltage may be sufficient, but when the speed of the chip is low, a high supply voltage may be required to complete operations.

Considering the problems of process distribution and yield of the chip, a conventional method for determining the supply voltage is to accommodate the chip with the lowest speed. That is, for both a high speed chip and a low speed chip, a same supply voltage is utilized under a same operating frequency. Although the low speed chip can operate normally under these circumstances, when a high speed chip operates under an unnecessarily high supply voltage, leakage current may be increased, thereby increasing the power consumption.

To address the above problem, an adaptive voltage scaling technique has been proposed to enable a chip to operate under a suitable supply voltage. The adaptive voltage scaling technique establishes an AVS look-up table regarding each chip, so the electronic product can determine the most suitable supply voltage. AVS scanning or measurement may require a lot of time during a mass production and testing process, however, which negatively affects production line operations. In addition, the environment of the testing machine during the mass production process is different from that of the final electronic product, so there is a lack of environmental correlation between the testing machine and the final electronic product. As a result, the AVS look-up table established during the mass production and testing process might be not suitable for the final electronic product.

SUMMARY OF THE INVENTION

Thus, an objective of the present invention is to provide an adaptive voltage scaling (AVS) scanning method, which can perform an AVS scanning operation to establish an AVS look-up table after a system on chip (SoC) is mounted on a printed circuit board (PCB) of a final product, to solve the problems of the related art.

In one embodiment of the present invention, an AVS scanning method is disclosed. The AVS scanning method comprises the steps of: mounting an SoC on a PCB, and connecting the SoC to a storage unit; enabling the SoC to read a boot code from the storage unit, and executing the boot code to perform an AVS scanning operation on the SoC to determine a plurality of target supply voltages respectively corresponding to a plurality of operating frequencies of the SoC, to establish an AVS look-up table; and storing the AVS look-up table into the SoC or the storage unit.

In another embodiment of the present invention, an electronic device comprising an SoC and a storage unit is disclosed. When the SoC is enabled, the SoC reads a boot code from the storage unit, and executes the boot code to perform an AVS scanning operation on the SoC to determine a plurality of target supply voltages respectively corresponding to a plurality of operating frequencies of the SoC, to establish an AVS look-up table; and the SoC stores the AVS look-up table into a memory of the SoC or the storage unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
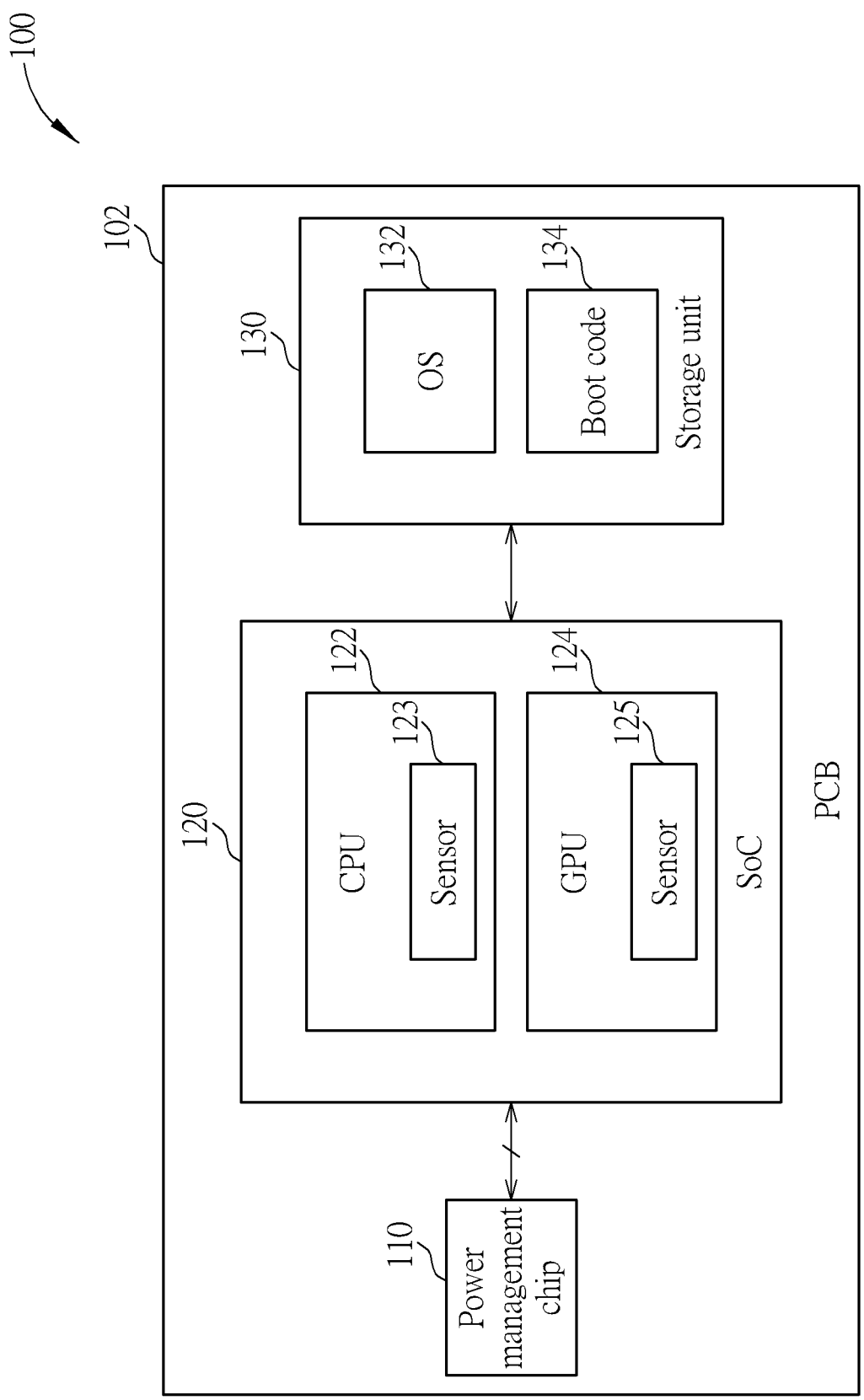
FIG. 1 is a diagram illustrating an electronic device according to an embodiment of the present invention.

FIG. 1 is a diagram illustrating an electronic device 100 according to an embodiment of the present invention. As shown in FIG. 1, the electronic device 100 comprises a printed circuit board (PCB) 102. The PCB 102 comprises a power management chip 110, a system on chip (SoC) 120 and a storage unit 130, where the SoC 120 comprises a central processing unit (CPU) 122 and a graphic processing unit 124. The CPU 122 and the GPU 124 comprise sensors 123 and 125, respectively, for AVS scanning, and the storage unit 130 comprises and stores an operating system (OS) 132 and a boot code 134. In one embodiment, the SoC 120 and the storage unit 130 may be integrated into a same SoC. In this embodiment, the electronic device 100 may be any electronic product, such as a set-top box, a mobile phone, a tablet, a laptop computer, a desktop computer, a television, etc., and the electronic device 100 may be a final product or a semi-finished product (e.g. which does not have a shell mounted thereon) of the aforementioned electronic product.

In this embodiment, the SoC 120 starts to perform an AVS scanning operation after the SoC 120 is mounted on the PCB 102, e.g. the PCB 102 performs the AVS scanning during a testing phase of a factory, to establish an AVS look-up table. Thus, as the SoC performs the AVS scanning on the final product or the semi-finished product of the electronic device 100, the impact of the SoC 120 during operations due to the layout of other components on the PCB 102 may be known, meaning the determined AVS look-up table can reflect real operation status of the SoC 120 with a higher accuracy.

In one example, assume that the SoC 120 has been mounted on the PCB 102 and connected with the power management chip 110 and the storage unit 130, and the OS 132 and the boot code 134 have been written into the storage unit 130. When the electronic device 100 is enabled for a first time (e.g. powered on), the CPU 122 within the SoC 120 may read the boot code 134 from the storage unit 130, and execute the boot code 134 to control/instruct the power management chip 110 to generate a plurality of different supply voltages to the SoC 120. This allows the CPU 122 to perform the AVS scanning through the sensor 123 to determine a plurality of first target supply voltages respectively corresponding to a plurality of first operating frequencies of the CPU 122. Furthermore, the GPU 124 also performs the AVS scanning through the sensor 125 to determine a plurality of second target supply voltages respectively corresponding to a plurality of second operating frequencies of the GPU 124. Finally, the AVS look-up table can be established according to the plurality of first target supply voltages respectively corresponding to the plurality of first operating frequencies of the CPU 122 and the plurality of second target supply voltages respectively corresponding to the plurality of second operating frequencies of the GPU 124, and the AVS look-up table can be stored into a memory within the SoC 120 or the storage unit 130 for further usage. Examples of the memory and the storage unit 130 may include, but are not limited to: a one-time programmable (OTP) memory, an eFUSE, a flash, etc.

Figure 2:
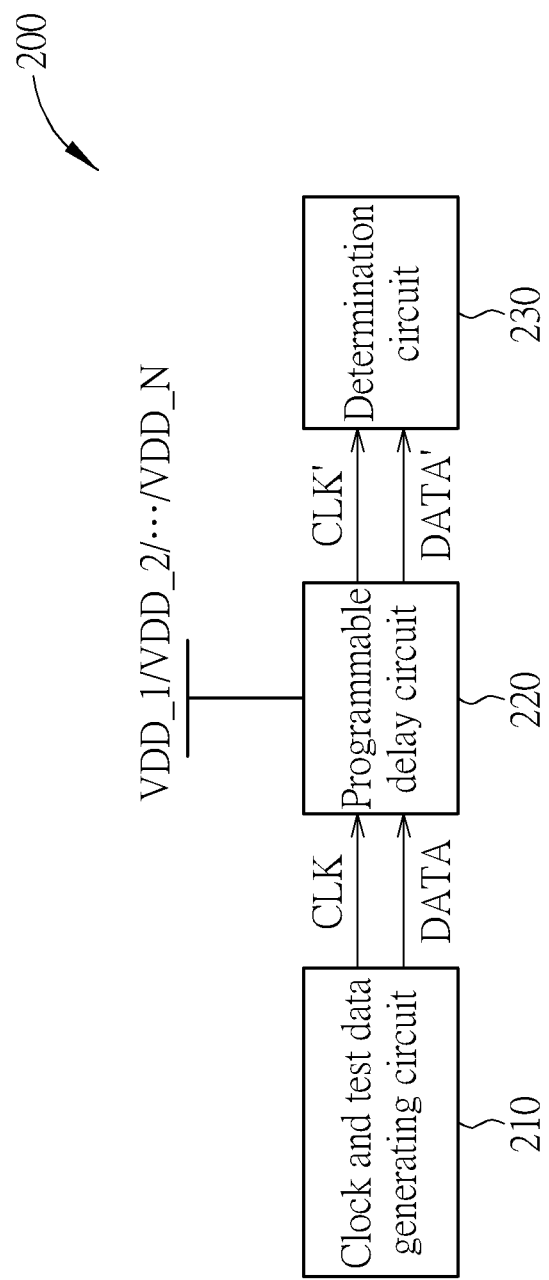
FIG. 2 is a diagram illustrating a sensor according to an embodiment of the present invention.

FIG. 2 is a diagram illustrating a sensor according to an embodiment of the present invention. The sensor 200 may be configured to implement any of the sensors 123 and 125 shown in FIG. 1, and the sensor 200 comprises a clock and test data generating circuit 210, a programmable delay circuit 220 and a determination circuit 230. Taking the sensor 200 as the sensor 123 within the CPU 122 for illustration, the CPU 122 may control the clock and test data generating circuit 210 to generate a clock signal CLK and test data DATA having a first operating frequency (e.g. 1 GHz), and the clock and test data generating circuit 210 outputs the clock signal CLK and the test data DATA to the programmable delay circuit 220. At this time, the CPU 122 instructs the power management chip 110 to sequentially generate a plurality of supply voltages VDD_1 to VDD_N for the CPU 122, from low to high, to make the programmable delay circuit 220 output multiple sets of clock signals CLK' and test data DATA' respectively corresponding to the supply voltages VDD_1 to VDD_N, where each set of clock signals CLK' may be a delayed clock signal generated by the programmable delay circuit 220 based on the clock signal CLK. Similarly, each set of test data DATA' may be a delayed test data generated by the programmable delay circuit 220 based on the test data DATA. Then, the determination circuit 230 determines a target supply voltage (e.g. a most suitable supply voltage) under the 1 GHz operating frequency according to the multiple sets of test data DATA' and/or the multiple sets of clock signals CLK', e.g. the determination circuit 230 may first determine a portion of test data DATA' that have qualified signal qualities among the multiple sets of test data DATA', and selects the lowest supply voltage among the supply voltages corresponding to the portion of test data DATA' to be the most suitable supply voltage. For example, assuming that test data DATA' generated by the programmable delay circuit 220 under the supply voltages VDD_4 to VDD_N have qualified signal qualities (e.g. patterns of the test data DATA' conform to a predetermined pattern), the determination circuit 230 may select VDD_4 to be the target supply voltage. Then, the CPU 122 may control the clock and test data generating circuit 210 to generate a clock signal CLK and test data DATA having another first operating frequency (e.g. 1.1 GHz), and determine a target supply voltage under the 1.1 GHz operating frequency via the aforementioned operations. Deduced by analogy, a plurality of first target supply voltages respectively corresponding to the plurality of first operating frequencies may be obtained. Similarly, the GPU 124 may obtain a plurality of second target supply voltages respectively corresponding to the plurality of second operating frequencies via the aforementioned operations.

It should be noted that the circuit architecture of the sensor 200 shown in FIG. 2 and the operation details therein are for illustrative purposes only, and are not limitations of the present invention. In other embodiments, as long as the CPU 122 and the GPU 125 may obtain the most suitable supply voltages respectively corresponding to different operating frequencies via the sensors 123 and 125, the sensor 200 may have other designs and perform different operations.

After the AVS look-up table is completely established and stored in the SoC 120 or the storage unit 130, when a user uses the electronic device 100, the CPU 122 and the GPU 124 may obtain related information from the AVS look-up table according to an operating frequency thereof, and transmit this related information to the power management chip 110, thereby enabling the power management chip 110 to provide a supply voltage corresponding to the operating frequency of the CPU 122 and the GPU 124.

In the aforementioned embodiment, the SoC 120 may establish one AVS look-up table only for both the CPU 122 and the GPU 124 to utilize, or may establish two AVS look-up tables to be respectively utilized by the CPU 122 and the GPU 124. In this case, one AVS look-up table comprises a plurality of first operating frequencies of the CPU 122 and a plurality of corresponding first target supply voltages and the other AVS look-up table comprises a plurality of second operating frequencies of the GPU 124 and a plurality of corresponding second target supply voltages.

In the embodiment shown in FIG. 1, the SoC 120 comprises the CPU 122 and the GPU 124. In other embodiments, the SoC 120 may merely comprise one processor, e.g. merely comprise the CPU 122.

In the embodiment shown in FIG. 1, the power management chip 110 is positioned outside the SoC 120. In other embodiments, the power management chip 110 and the SoC 120 may be integrated into a same package, or the power management chip 110 may be integrated into a portion of the SoC 120.

Figure 3:
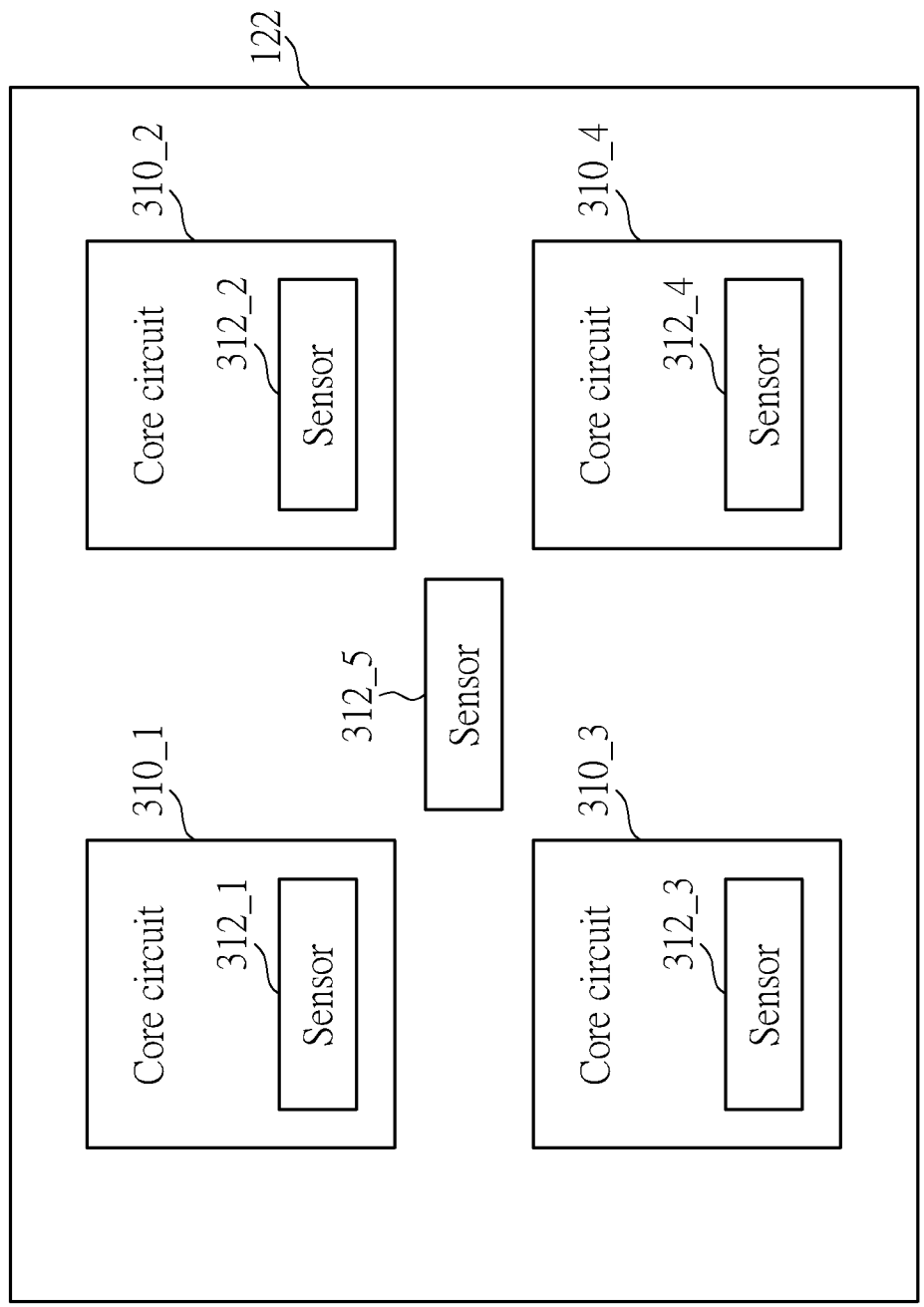
FIG. 3 is a diagram illustrating a central processing unit (CPU) according to an embodiment of the present invention.

In the embodiment shown in FIG. 1, the CPU 122 and the GPU 124 each merely comprise one sensor. In other embodiments, the CPU 122 and the GPU 124 each may comprise multiple sensors for generating the AVS look-up table. For example, referring to the CPU 122 shown in FIG. 3, the CPU 122 comprises four core circuits 310_1 to 310_4, wherein the core circuits 310_1 to 310_4 comprise sensors 312_1 to 312_4, respectively, and the CPU 122 further configures a sensor 312_5 in the middle of the sensors 312_1 to 312_4. In the embodiment shown in FIG. 3, when the electronic device 100 is enabled for a first time (e.g. powered on), each of the sensors 312_1 to 312_5 may obtain a plurality of target supply voltages respectively corresponding to a plurality of operating frequencies according to the aforementioned operations of the sensor 200. As each of the sensors 312_1 to 312_5 corresponds to different core circuits, and positions of the sensors 312_1 to 312_5 are different, the determined target supply voltages might be different. In order to ensure that the CPU 122 can operate normally, when the sensor 312_1 to 312_5 obtains two or more target supply voltages regarding one operating frequency, the CPU 122 may select the highest target supply voltage among these target supply voltages for establishing the AVS look-up table. For example, assuming that under the 1.1 GHz operating frequency, the determined target supply voltages of the sensors 312_1 to 312_5 are VDD_2, VDD_2, VDD_3, VDD_2 and VDD_2, respectively, the CPU 122 may select the target supply voltage VDD_3 to correspond to the 1.1 GHz operating frequency in the AVS look-up table.

It should be noted that, in the above embodiments, the SoC 120 performs the AVS scanning when the electronic device 100 is enabled for a first time (e.g. powered on) to establish the AVS look-up table for further usage. Considering aging of internal circuit components and other system problems, the AVS look-up table might become unsuitable over time. Thus, in this embodiment, the CPU 122 and/or the GPU 124 may perform the AVS scanning periodically or based on a schedule, to update the AVS look-up table stored in the SoC 120 or the storage unit 130.

Figure 4:
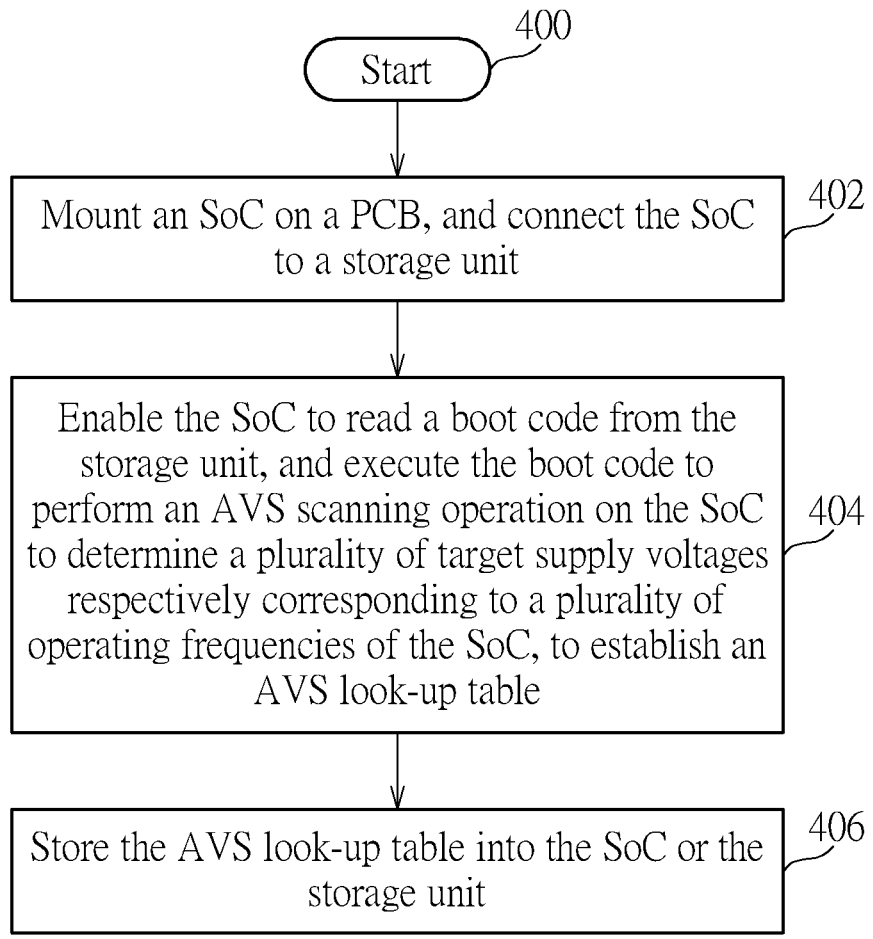
FIG. 4 is a flowchart illustrating an AVS scanning method according to an embodiment of the present invention.

FIG. 4 is a flowchart illustrating an AVS scanning method according to an embodiment of the present invention. Referring to the related descriptions in the above embodiments, the flow of the AVS scanning method is illustrated as follows.

Step 400: the flow starts.

Step 402: mount an SoC on a PCB, and connect the SoC to a storage unit.

Step 404: enable the SoC to read a boot code from the storage unit, and execute the boot code to perform an AVS scanning operation on the SoC to determine a plurality of target supply voltages respectively corresponding to a plurality of operating frequencies of the SoC, to establish an AVS look-up table.

Step 406: store the AVS look-up table into the SoC or the storage unit.

Briefly summarized, the AVS scanning method of the present invention performs the AVS scanning operation after the SoC is mounted on the PCB of the final product, to establish the AVS look-up table for further usage in operations of the electronic product. As the SoC has already been positioned in the final product when the SoC performs the AVS scanning operation, and peripheral components thereof are no longer changed, the determined AVS look-up table can effectively enable the SoC to obtain the most suitable supply voltage for future operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adaptive voltage scaling (AVS) scanning method, comprising:
   mounting a system on chip (SoC) on a printed circuit board (PCB), and connecting the SoC to a storage unit;
   after the SoC is mounted on the PCB, enabling the SoC for a first time to read a boot code from the storage unit, and executing the boot code to perform an AVS scanning operation on the SoC to determine a plurality of target supply voltages respectively corresponding to a plurality of operating frequencies of the SoC, to establish an AVS look-up table with the plurality of target supply voltages and the plurality of operating frequencies; and
   storing the AVS look-up table into the SoC or the storage unit.

2. The AVS scanning method of claim 1, wherein the step of enabling the SoC to read the boot code from the storage unit and executing the boot code to perform the AVS scanning operation on the SoC comprises:
   during a testing phase, when the SoC is enabled for the first time to read the boot code from the storage unit, executing the boot code to perform the AVS scanning operation on the SoC in order to establish the AVS look-up table.

3. The AVS scanning method of claim 2, further comprising:
   controlling the SoC to perform the AVS scanning operation periodically or based on a schedule, to update the AVS look-up table.

4. The AVS scanning method of claim 1, wherein a power management chip is further mounted on the PCB, and the step of enabling the SoC to read the boot code from the storage unit and executing the boot code to perform the AVS scanning operation on the SoC to determine the plurality of target supply voltages respectively corresponding to the plurality of operating frequencies of the SoC in order to establish the AVS look-up table further comprises:
   enabling the SoC to read the boot code from the storage unit, and executing the boot code to control the power management chip to generate a plurality of different supply voltages to the SoC for performing the AVS scanning operation on the SoC to determine the plurality of target supply voltages respectively corresponding to the plurality of operating frequencies of the SoC in order to establish the AVS look-up table.

5. The AVS scanning method of claim 4, wherein the step of enabling the SoC to read the boot code from the storage unit and executing the boot code to perform the AVS scanning operation on the SoC comprises:
   during a testing phase, when the SoC is enabled for the first time to read the boot code from the storage unit, executing the boot code to perform the AVS scanning operation on the SoC, to establish the AVS look-up table.

6. The AVS scanning method of claim 1, wherein the SoC comprises a central processing unit (CPU) and a graphics processing unit (GPU); and the step of performing the AVS scanning operation on the SoC to determine the plurality of target supply voltages respectively corresponding to the plurality of operating frequencies of the SoC to establish the AVS look-up table comprises:
   performing the AVS scanning operation on the CPU to determine a plurality of first target supply voltages respectively corresponding to a plurality of first operating frequencies of the CPU;
   performing the AVS scanning operation on the GPU to determine a plurality of second target supply voltages respectively corresponding to a plurality of second operating frequencies of the GPU; and
   establishing the AVS look-up table according to the plurality of first target supply voltages respectively corresponding to the plurality of first operating frequencies of the CPU and the plurality of second target supply voltages respectively corresponding to the plurality of second operating frequencies of the GPU.

7. The AVS scanning method of claim 1, wherein the SoC comprises at least one sensor; and the step of performing the AVS scanning operation on the SoC to determine the plurality of target supply voltages respectively corresponding to the plurality of operating frequencies of the SoC to establish the AVS look-up table comprises:
under any operating frequency of the plurality of operating frequencies of the SoC, applying a plurality of supply voltages to the at least one sensor for generating multiple sets of test data; and
determining a target supply voltage corresponding to the operating frequency according to the multiple sets of test data.

8. The AVS scanning method of claim 7, wherein the at least one sensor comprises a plurality of sensors, and the plurality of sensors are positioned in a plurality of core circuits of the SoC, respectively.

9. The AVS scanning method of claim 7, wherein each sensor comprises a programmable delay circuit; and under any operating frequency of the plurality of operating frequencies of the SoC, the step of applying the plurality of supply voltages to the at least one sensor for generating the multiple sets of test data comprises:
inputting a clock signal and test data having the operating frequency to the programmable delay circuit; and
applying the plurality of supply voltages to the programmable delay circuit, to make the programmable delay circuit output the multiple sets of test data respectively corresponding to the plurality of supply voltages.

10. An electronic device, comprising:
a system on chip (SoC); and
a storage unit, storing a boot code;
wherein after the SoC is mounted on a printed circuit board (PCB), the SoC is enabled for a first time to read the boot code from the storage unit, and executes the boot code to perform an AVS scanning operation on the SoC to determine a plurality of target supply voltages respectively corresponding to a plurality of operating frequencies of the SoC in order to establish an AVS look-up table with the plurality of target supply voltages and the plurality of operating frequencies; and the SoC stores the AVS look-up table into a memory of the SoC or the storage unit.

11. The electronic device of claim 10, wherein during a testing phase of the electronic device, when the SoC is enabled for the first time to read the boot code from the storage unit, the SoC executes the boot code to perform the AVS scanning operation in order to establish the AVS look-up table.

12. The electronic device of claim 11, wherein the SoC performs the AVS scanning operation periodically or based on a schedule, to update the AVS look-up table.

13. The electronic device of claim 10, further comprising:
a power management chip;
wherein when the SoC is enabled, the SoC reads the boot code from the storage unit, and executes the boot code to control the power management chip to generate a plurality of different supply voltages to the SoC, for performing the AVS scanning operation on the SoC to determine the plurality of target supply voltages respectively corresponding to the plurality of operating frequencies of the SoC in order to establish the AVS look-up table.

14. The electronic device of claim 13, wherein during a testing phase of the electronic device, when the SoC is enabled for the first time to read the boot code from the storage unit, the SoC executes the boot code to perform the AVS scanning operation to establish the AVS look-up table.

15. The electronic device of claim 10, wherein the SoC comprises a central processing unit (CPU) and a graphics processing unit (GPU); the SoC performs the AVS scanning operation on the CPU to determine a plurality of first target supply voltages respectively corresponding to a plurality of first operating frequencies of the CPU; and the SoC performs the AVS scanning operation on the GPU to determine a plurality of second target supply voltages respectively corresponding to a plurality of second operating frequencies of the GPU for establishing the AVS look-up table.

16. The electronic device of claim 10, wherein the SoC comprises at least one sensor, and under any operating frequency of the plurality of operating frequencies of the SoC, the SoC applies a plurality of supply voltages to the at least one sensor for generating multiple sets of test data, and the SoC determines a target supply voltage corresponding to the operating frequency according to the multiple sets of test data.

17. The electronic device of claim 16, wherein the at least one sensor comprises a plurality of sensors, and the plurality of sensors are positioned in a plurality of core circuits of the SoC, respectively.

18. The electronic device of claim 16, wherein each sensor comprises a programmable delay circuit, and the at least one sensor inputs a clock signal and test data having the operating frequency to the programmable delay circuit, and applies the plurality of supply voltages to the programmable delay circuit, to make the programmable delay circuit output the multiple sets of test data respectively corresponding to the plurality of supply voltages.

* * * * *